Patented Dec. 24, 1929

1,740,891

UNITED STATES PATENT OFFICE

GEORGE HOLLAND ELLIS, OF SPONDON, NEAR DERBY, ENGLAND, ASSIGNOR TO CELA-NESE CORPORATION OF AMERICA, A CORPORATION OF DELAWARE

COLORING OF PRODUCTS COMPRISING CELLULOSE ACETATE

No Drawing. Original application filed September 25, 1923, Serial No. 664,780, and in Great Britain January 27, 1923. Divided and this application filed December 27, 1926. Serial No. 157,410.

This invention relates to the dyeing, which term includes printing and stencilling of artificial yarns or threads, filaments, fabrics, films or other products made of or containing cellulose acetate.

According to the invention of U. S. application S. No. 664,780, coloring matters or organic compounds which have an affinity for cellulose acetate or are capable of coloring the same, but which are insoluble or practically insoluble in water or are of relatively low solubility in water, all of which are hereinafter included in the expression relatively water-insoluble compounds, are applied for the dyeing or coloring of threads, filaments, fabrics, films or other products such as referred to, by employing them in the form of solubilized i. e. soluble or more soluble modifications obtained by pretreating them with bodies having oily or fatty characteristics. containing salt-forming groups capable of forming soluble salts with alkalies or ammonia, for example the sulpho group or the carboxyl group or both sulpho and carboxyl groups, or salts of such bodies, such for instance as their sodium or other alkali salts or ammonium salts. Such bodies and their salts are hereinafter, as in the said application, included in the term body of oily or fatty characteristics. In particular one can employ sulphoricinoleic acid or other sulphonated fatty acids or salts thereof such as referred to, but other bodies of oily or fatty characteristics may be employed, such as oleic, stearic or palmitic acid, or salts thereof such for instance as the sodium or other alkali salts or ammonium salts. Mixtures of two or more than two of any of the aforesaid solubilizing agents may be employed.

The invention may especially be employed for dyeing cellulose acetate with non-sulphonated or other insoluble or relatively insoluble organic compounds or coloring matters of the "azo" class. It may likewise be employed for dyeing cellulose acetate by the azoic or development process with simple amino bases other than amino azo coloring matters, or by any other coloring matters or compounds having an affinity for or capable of coloring cellulose acetate, but the use of which by the ordinary methods is impracticable or difficult owing to their insolubility or low solubility in water, such for example as unreduced coloring matters of the substituted quinone mono-imide class, generally comprised within the term indophenols; or coloring matters or compounds of the following classes usually containing no sulpho groups:— diphenylmethane, triphenylmethane, triarylmethane, oxazine, azine, diazine, thiazine, unreduced indigoid, or basic derivatives of the anthraquinone series; as instances may be mentioned, rosaniline base, alkylated or arylated rosaniline bases, pararosaniline base, tetramethyl - diparaamidotriphenyl carbinol (malachite green base) amino anthraquinones and aminohydroxy-anthra-quinones or their derivatives, such as 1: hydroxy 4: paratolyl amino anthraquinone, 1: paratolyl amino 4: methyl-aminoanthraquinone, safranine base, and so forth.

The present application is a divisional application from the said U. S. application S. No. 664,780 and has for object to claim specifically the employment in the aforesaid processes of unreduced coloring matters or organic compounds of the indigoid series, usually containing no sulpho groups.

It is known that the affinities of acetyl cellulose for various coloring matters are largely influenced by the chemical groups comprised in the constitutions of the molecules of the coloring matters, the groups; azo, amino, imino, imide, nitro, nitroso, isonitroso, hydroxyl, acidylamino, being favourable. For example, it may be stated that the group $-NH_2$ and its alkyl substituents, and the group $-N=N-$ are very favourable, the groups $-NO_2$ and $-OH$ are somewhat favourable, but the group $-SO_3H$ is very unfavourable to the fixation of the coloring matter by the acetyl cellulose material.

In carrying out the invention, the organic compounds or coloring matters having an affinity for or capable of dyeing acetyl cellulose may be dissolved in the body or bodies of oily or fatty characteristics and be afterwards added to the dye baths. Some of the coloring matters or compounds for instance dissolve easily direct in the alkali or ammonium salt of sulphoricinoleic or other sulphonated fatty acid; others are best dissolved in the free sulphonated fatty acid. Solution may be effected by simply stirring up the dyestuff with the acid or salt, heating if necessary. The mass can be afterwards diluted with water or aqueous alkali, boiled and filtered through cloth into the dyebath, which may be acid, neutral or alkaline. Dyeing can be conducted in the usual manner.

It is of course understood that mixtures of different coloring matters or organic compounds of the character hereinbefore referred to may be applied in the form of modifications solubilized or rendered more soluble by the solubilizing bodies of oily or fatty characteristics. Also that mixtures of such solubilizing bodies may be employed for solubilizing any of the compounds or coloring matters to be applied according to the invention.

Other coloring matters which are not deleteriously affected by the sulphonated fatty acid or salt or other body of oily or fatty characteristics may, when desired, be dyed on to the material together with the coloring matters or compounds of the character before indicated.

The compounds or coloring matters to be applied according to the invention may if desired be made into solid "solutions" or complexes or other concentrated preparations suitable for transport and subsequent dissolving and application, by heating them with the body or bodies of oily or fatty characteristics such as referred to—for example oleic, stearic, palmitic or sulphoricinoleic acid, etc. or their salts either by treatment in presence of little or no water, or by treatment in presence of larger quantities of water with subsequent concentration or drying. For example the preparations may be made by heating the organic compound or compounds or coloring matter or coloring matters with the body or bodies of oily or fatty characteristics and neutralizing or mixing while hot, with alkalies or ammonia as such, or in saturated or nearly saturated solutions. Or the coloring matters or compounds may be dissolved direct in the hot alkali salt or ammonium salt of the fatty or oily body or "soap" to give a solid solution or complex or concentrated preparation on cooling, and, where necessary drying. To dye the acetyl cellulose material the solid solution or complex made as above may be simply dissolved in hot water, the resultant solution being added to water in a suitable vessel and the dyeing be conducted as usual.

It is understood that the invention also extends to the dyeing of "mixed" fabrics or materials containing cellulose acetate associated with cotton, silk, wool or other threads or fibres with the classes of organic compounds or coloring matters herein referred to.

By way of example, in dyeing mixed goods, a quantity of one or more of the compounds or coloring matters, appropriate to the percentage of acetyl cellulose in the mixed material, may be dissolved, in the form of their solubilized modifications, in the dye bath and dyeing be proceeded with in the usual manner. Where the several dyestuffs or compounds and the requisite assistants are compatible and will mix together without deleterious effect the suitable coloring matter or coloring matters for the other fibre or fibres may be added to the same bath. Where this is not possible, these other fibres may be first selectively dyed by the application of suitable dyestuffs, and the acetyl cellulose be afterwards dyed selectively as above, or vice versa.

Instead of dyeing the mixed goods in uniform shades or in contrasting colors, the cellulose acetate portion may be dyed, leaving undyed the other fibre or one or more other fibres associated therewith.

This invention is likewise applicable to the printing or stencilling of threads, fabrics, or materials consisting of acetyl cellulose alone or associated with other fibres or materials. For this purpose, in applying the compounds or coloring matters having an affinity for acetyl cellulose, suitable amounts of their modifications obtained by treating them with sulphonated fatty acids or other bodies of oily or fatty characteristics, as above referred to, may be dissolved in water, thickened with substances such as starch, gums, dextrin, flour and the like, and the pastes thus formed be applied to the material consisting of or containing acetyl cellulose by printing from rollers, blocks, etc., or by stencilling, the material being then dried. The drying is often sufficient to fix the coloring matter, compound or primary amido base well enough, in other cases the material may be subjected to a short treatment with steam or "ageing". The printed or stencilled material may be washed or not as desired, and be finished as may be necessary.

Mixtures of different organic compounds or coloring matters may of course be applied by printing or stencilling according to the invention.

Generally it will be understood that in dyeing, printing or stencilling of materials consisting of or containing cellulose acetate, with the solubilized modifications of any of the organic compounds or coloring matters favourably constituted or having an affinity for cellulose acetate as referred to, other dyes may or may not be employed in combination or association with them in the same operation, or in separate operations, for the production of compound shades on the acetyl cellulose.

What I claim and desire to secure by Letters Patent is:—

1. In and for the dyeing of yarns, fabrics and other products comprising cellulose acetate, the employment of relatively water-insoluble unreduced coloring matters of the indigoid series, said coloring matters being employed in the form of solubilized modifications obtained by pretreating them with a solubilizing agent comprising a body of oily or fatty characteristics.

2. In and for the dyeing of yarns, fabrics and other products comprising cellulose acetate, the employment of relatively water-insoluble unreduced coloring matters of the indigoid series, said coloring matters being employed in the form of solubilized modifications obtained by pretreating them with a solubilizing agent comprising a higher fatty acid compound.

3. In and for the dyeing of yarns, fabrics and other products comprising cellulose acetate, the employment of relatively water-insoluble unreduced coloring matters of the indigoid series, said coloring matters being employed in the form of solubilized modifications obtained by pretreating them with a solubilizing agent comprising a sulphonated higher fatty acid compound.

4. In and for the dyeing of yarns, fabrics and other products comprising cellulose acetate, the employment of relatively water-insoluble unreduced coloring matters of the indigoid series, said coloring matters being employed in the form of solubilized modifications obtained by pretreating them with a solubilizing agent comprising a salt of a higher fatty acid.

5. In and for the dyeing of yarns, fabrics and other products comprising cellulose acetate, the employment of relatively water-insoluble unreduced coloring matters of the indigoid series, said coloring matters being employed in the form of solubilized modifications obtained by pretreating them with a solubilizing agent comprising a salt of a sulphonated higher fatty acid.

6. In and for the dyeing of yarns, fabrics and other products comprising cellulose acetate, the employment of relatively water-insoluble unreduced coloring matters of the indigoid series, said coloring matters being employed in the form of solubilized modifications obtained by pretreating them with a solubilizing agent comprising a sulphonated ricinoleic acid compound.

7. In and for the dyeing of yarns, fabrics and other products comprising cellulose acetate, the employment of relatively water-insoluble unreduced coloring matters of the indigoid series, said coloring matters being employed in the form of solubilized modifications obtained by pretreating them with a solubilizing agent comprising a salt of sulphoricinoleic acid.

8. In and for the dyeing of yarns, fabrics and other products comprising cellulose acetate, the employment of relatively water-insoluble unreduced coloring matters of the indigoid series, said coloring matters being employed in the form of solubilized modifications obtained by pretreating them with a solubilizing agent comprising sodium salt of sulphoricinoleic acid.

In testimony whereof I have hereunto subscribed my name.

GEORGE HOLLAND ELLIS.